United States Patent [19]
Bell et al.

[11] Patent Number: 5,532,004
[45] Date of Patent: Jul. 2, 1996

[54] CHEWING GUM CONTAINING HYDROPHOBIC FLAVORANT ENCAPSULATED IN A HYDROPHILIC SHELL

[75] Inventors: Joseph W. Bell, Bethlehem, Pa.; Thomas J. Carroll, Oak Ridge, N.J.; Wayne J. Puglia, New York, N.Y.

[73] Assignee: Nabisco, Inc., Parsippany, N.J.

[21] Appl. No.: 424,238

[22] Filed: Apr. 19, 1995

Related U.S. Application Data

[63] Continuation of Ser. No. 81,535, Jun. 23, 1993, abandoned.

[51] Int. Cl.$^6$ .................................................. A23G 3/30
[52] U.S. Cl. ........................ 426/5; 426/96; 426/576; 426/650; 426/651
[58] Field of Search ..................... 426/3–6, 96, 650, 426/651, 576

[56] References Cited

U.S. PATENT DOCUMENTS

| | | | |
|---|---|---|---|
| 2,886,440 | 5/1959 | Kramer et al. | 426/5 |
| 2,886,441 | 5/1959 | Kramer et al. | 426/5 |
| 2,886,448 | 5/1959 | Kramer et al. | 426/5 |
| 3,985,913 | 10/1976 | Johnson et al. | 426/96 |
| 4,001,438 | 1/1977 | Marmo et al. | 426/96 |
| 4,448,789 | 5/1984 | Yang | 426/5 |
| 4,520,033 | 5/1985 | Tuot | 426/96 |
| 4,634,598 | 1/1987 | Liu et al. | 426/96 |
| 4,707,367 | 11/1987 | Miller et al. | 426/96 |
| 4,963,369 | 10/1990 | Song et al. | 426/5 |
| 5,004,595 | 4/1991 | Cherukuri et al. | 426/5 |
| 5,124,162 | 6/1992 | Bošković | 426/96 |
| 5,128,155 | 7/1992 | Song et al. | 426/5 |
| 5,154,927 | 10/1992 | Song et al. | 426/5 |
| 5,204,029 | 4/1993 | Morgan et al. | 426/96 |
| 5,266,335 | 11/1993 | Cherukuri et al. | 426/96 |

*Primary Examiner*—Jeanette Hunter

[57] ABSTRACT

Chewing gum containing particles of a flavoring component in which the flavorant is encapsulated in a hydrophilic gelation shell.

6 Claims, No Drawings

CHEWING GUM CONTAINING HYDROPHOBIC FLAVORANT ENCAPSULATED IN A HYDROPHILIC SHELL

This is a continuation of application Ser. No. 08/081,535 filed on Jun. 23, 1993, now abandoned.

BACKGROUND OF THE INVENTION

The present invention relates to chewing gums. It relates in particular to gums and candy containing flavorants, and particularly flavorants of natural or artificial origin. The invention relates more particularly to gums having a particular flavoring component which comprises a specially prepared combination of flavorant and encapsulating agent.

The pertinent literature describes gum formulations in which the flavorant is entrapped, encapsulated, impregnated within porous microbeads or is otherwise physically surrounded. One example is U.S. Pat. No. 5,128,155 which describes a chewing gum having a flavor releasing composition comprising a cellulosic material, a silica and a flavoring agent. The cellulosic material or other thermoplastic or thermosetting material is required by this patent to be present in the core which contains the flavoring agent. Thus, the constituent embodying the flavoring agent comprises several ingredients which are otherwise inert to the gum. The cellulosic or equivalent material, particularly when present simultaneously with silica in the gum, poses the risk of detracting from the desirable texture when chewed. This aspect seriously undermines the attractiveness of the purported advantage described in U.S. Pat. No. 5,128,155, since a gum which is gritty or otherwise has an unattractive texture in the mouth will not be purchased regardless of how the flavor is presented in the gum.

U.S. Pat. No. 4,001,438 discloses flavor compositions useful in chewing gums. Here, also, the flavoring component requires the presence of a solid suspending agent such as colloidal silica, xanthin gum or ethyl cellulose. Thus, the flavor-bearing constituent to be incorporated into the gum is required by this patent to be composed of a multiplicity of ingredients which do not otherwise contribute to the desirable characteristics of the gum such as texture or flexibility.

U.S. Pat. No. 4,963,369 discloses a chewing gum in which flavor ingredients are impregnated into porous polymeric beads. This patent is yet another example of gum formulations containing components in which the flavoring ingredient is physically trapped.

Those familiar with the manufacture of chewing gums and confections are aware that flavoring agents can be vulnerable to gradual degradation in finished products. This degradation can even be accelerated through mediation by one or more other ingredients present in the product. By "mediation" is meant that the presence of such other ingredient(s) in the form in which it or they are present appears to accelerate the decomposition of the flavoring agent, regardless of whether the mechanism of decomposition is chemical reaction, catalysis of reaction with other components, oxidation, or otherwise. The products which have the potential for mediating the degradation of the flavorants include sweeteners or other agents whose presence is obviously desirable in the final product. Past attempts to prevent or retard degradation of the flavorants have generally involved physically separating or isolating the flavorants within the formulation, by means such as encapsulation or other physical entrapment mechanisms, in order to enable the flavorants present to contribute as fully as desired to the flavor of the final product.

It is also recognized in this art that the consumer's perception of the flavorant(s) upon chewing is important to the acceptance of the gum or confection by the consumer. Attributes including the initial impact of flavor upon the onset of chewing, and the extension of duration of the flavor during chewing, are particularly important. Achieving a desirable balance of both properties is a challenge, particularly since it is frequently found that techniques which enhance one such property do so to the detriment of the other.

Thus, there is a need for chewing gum compositions which satisfy the objectives of exhibiting a sufficient degree of initial flavor impact while protecting, and even enhancing, flavor extension and the stability of the flavorants present.

BRIEF SUMMARY OF THE INVENTION

The present invention meets the aforementioned objectives as well as other desired characteristics that will be apparent.

In one aspect, the present invention comprises a chewing gum comprising a gum base, a flavoring component, and optionally a sweetening component, wherein the flavoring component consists of particles of one or more hydrophobic flavorants encapsulated in a hydrophilic shell.

Another aspect of the invention is an improved method of making chewing gum by combining in any sequence gum base, a flavoring component as described herein, and, optionally, a sweetening component. The gum made by this method provides strong initial flavor impact, extends the flavor, reduces plasticization of the gum by the flavorant, and retards or prevents oxidative degradation of the flavorant.

DETAILED DESCRIPTION OF THE INVENTION

The invention will be described with respect to its embodiment in chewing gums, by which is meant gums in all forms whether sugar-containing or sugar-free, bubble gum or conventional chewing gum, and the like. The chewing gum of the present invention comprises the gum base itself, optional solvents, and/or plasticizers. The amount of gum base employed will vary greatly depending on various factors such as the type of base used, consistency desired and other components used to make the final product. In general, amounts of about 5% to about 50% by weight of the final chewing gum composition are acceptable for use in the chewing gum compositions, preferred amounts thereof being about 15% to about 25% by weight.

The gum base may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinyl acetate, and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins, or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene; and mixtures thereof. The solvent may be employed in an amount ranging from about 10% to about 75% and preferably about 45% to about 70% by weight to the gum base.

The gum base can also contain any of a variety of traditional ingredients such as plasticizers or softeners such as lanolin, stearic acid, sodium stearate, potassium stearate, glyceryl triacetate, glycerine and the like and/or waxes, for example, natural waxes, petroleum waxes, such as polyethylene waxes, paraffin waxes and microcrystalline waxes, to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include conventional additives such as emulsifiers such as lecithin and glyceryl monostearate; and additional fillers such as aluminum hydroxide, magnesium hydroxide, alumina, aluminum silicates, calcium carbonate, and talc and combinations thereof. These fillers may be used in the gum base in various amounts. Preferably the amount of fillers when used will vary from about 4 to about 30% by weight of the final chewing gum.

The chewing gums of this invention also contain a flavoring component which comprises particles of a hydrophobic flavorant encapsulated in a shell of a hydrophilic material.

Suitable flavorants include both natural and artificial flavors and mints, such as oil of peppermint, menthol, oil of spearmint, vanilla, oil of cinnamon, oil of wintergreen (methyl salicylate), and various fruit flavors, including but not limited to lemon oil, orange oil, grape flavor, lime oil, grapefruit oil, apple, apricot essence, and combinations thereof. The flavorings are generally utilized in amounts that will vary depending upon the individual flavor. Optionally, a small amount of a vegetable oil or equivalent material can be added to the flavor oil when it is desired to lessen any overly strong impact of the flavor.

The flavoring component of the gums of the present invention (i.e.. flavorant plus shell) preferably comprises about 0.005% to about 3.0% by weight of the final chewing gum product. The flavoring component, in turn, preferably comprises about 20 to about 90% by weight flavorant, and the balance the shell. For example, in said particles said flavorants comprise about 70 wt. % of the particle and said shell comprises about 30 wt % thereof.

The shell is composed of any hydrophilic, or water-soluble, shell-forming material, such as gelatin, agar, shellac, gum arabic, alginic acid and salts thereof, and xanthan gum. Mixtures of any of the foregoing can also be used.

The present invention contributes ease and economy of formulation, with an unprecedented realization of benefits. Those benefits include unimpeded onset of flavor during the initial chew coupled with a prolonged extension of the flavor effect during chewing, all of which are realized together with the full, undegraded effect of the flavoring component. Other benefits include lessening of the plasticization of the gum base by the flavorant, and retarded or eliminated oxidation of the flavorant.

Notably, the use of the encapsulated flavoring component as described herein permits attainment of a given level of flavor perception with less flavorant; that is, the availability of the flavorant appears enhanced. Indeed, gums of the present invention achieve far greater flavor impact than is achievableby other known flavoring techniques. This advantage is particularly unexpected since the shell would be thought to introduce around the flavor a barrier to flavor perception which is not present in conventional gums. Without being bound by any particular theory, it is believed that the encapsulated flavorant is less likely to be masked within the gum base, by absorption into the gum base or otherwise; under this theory, a greater proportion out of any total loading of flavor is "available" for perception by the consumer. In conventional gum formulations wherein the flavorants are not encapsulated, certain components of the flavorant can become entrapped in the gum base; or, components of the flavorant can be lost during processing of the gum. The result can be an unwanted change to the character of the flavor.

The present invention minimizes these problems. In addition, particularly when the present invention is carried out using liquid flavorant oils or solutions, the present invention permits the operator to avoid unwanted loss of flavor components if the operator chooses to dry (spray-dry) the flavorant. This, in turn, reduces the cost of the operation and permits retention of the more volatile components of the flavorant, as drying generally requires the application of heat which absent the encapsulating shell would drive off the more volatile components and could even alter the structure of flavor components. As a result, the perceived flavor is stronger and fuller.

Preparation of the encapsulated flavoring component used in the present invention can be carried out by the techniques described in European Patent Application No. 89303098.1, the content of which is hereby incorporated herein by reference. In general, an aqueous solution is formed of hydrophilic material such as gelatin, gum arabic, agar, shellac, or a mixture of two or more of these. Then, hydrophobic flavorant is added in small droplet amounts. It is often advantageous to add a small amount of a food grade emulsifier such as lecithin or a monoglyceride or diglyceride, sorbitan monostearate, or polysorbate 60, and then to agitate and emulsify the system. Using gelatin as an example of a hydrophilic shell material, the gelatin is then caused to turn into a solid by one of several techniques, such as:

1. pH adjustment to the isoelectric point of the gelatin, typically pH 4.8 using a dilute acid, 2. Increasing the osmotic pressure by slow addition of a salt that causes the gelatin to precipitate, such as sodium citrate, 3. Slow addition of a polymer nonsolvent that causes the polymer (gelatin in this case) to thicken and form a solid. Ethanol could be used in this example.

4. Slow cooling of the system so the gelatin would set up.

Another process of interest would involve complex coacervation. Here a mixture of e.g. 1% gelatin and 1% gum arabic are mixed with peppermint oil. Gelatin can have a range of isoelectric points from 4 to 9, depending on the procedure used in making it. Assuming that the gelatin has an isoelectric point of 4.8, then above a pH of 4.8, the gelatin is negatively charged. Below pH 4.8, the gelatin is positively charged. By contrast the gum arabic contains many carboxylic acid groups. Therefore, it is negatively charged. When the mixture is made, the pH should be above pH 4.8, so both the gelatin and the gum arabic are negatively charged. At this point they do not react with each other. Then acetic acid, or dilute hydrochloric acid is added. As the pH drops below pH 4.8, the gelatin becomes positively charged and is therefore attracted to the gum arabic. They therefore precipitate and form a shell around the peppermint oil. This would provide a stronger shell than one containing gelatin alone.

The particles, however formed, can then be recovered e.g. by filtration or centrifugation, and then dried, for instance in a spray dryer or a fluid bed dryer.

The particles can generally be about 0.1 mm to about 3.0 mm in diameter; since these limits are not believed to be critical, particle diameters outside this range are believed useful. Preferably a greater fraction or all of the particles are about 0.1 mm to about 1.0 mm in diameter. It will be recognized that a gum formulation can contain particles having a range of different diameters.

Relative amounts of flavorant to shell can be adjusted depending on the desired taste characteristics of the final product. It is a significant and unexpected advantage of this invention that the advantages described herein can be realized over a wide range of ratios of flavorant to shell.

The present invention contemplates the optional inclusion in the chewing gum of a sweetener component which comprises any one or more sweeteners known in the art, including both natural and artificial sweeteners. Thus, sweeteners may be chosen from the following non-limiting list, which includes sugars such as sucrose, glucose, corn syrup, dextrose, invert sugar, fructose and mixtures thereof; saccharine and its various salts such as the sodium or calcium salt; cyclamic acid and its various salts such as the sodium salt; free aspartame; dihydrochalcone sweetening compounds; glycyrrhizin; Stevia rebaudiana (Stevioside); monellin, thalmatin, Sucralose, neosugar, and polydextrose; and sugar alcohols such as sorbitol, sorbitol syrup, mannitol, xylitol, isomaltitol, lactitol, maltitol, and the like. Also contemplated as a sweetener is the nonfermentable sugar substitute hydrogenated starch hydrolysate (also known as Lycasin) which is described in U.S. Pat. No. Re. 26,959. Also contemplated is the synthetic sweetener 3,6-dihydro-6-methyl-1-1,2,3-oxathiazin-4-one-2,2-dioxide, particularly the potassium (Acesulfame-K), sodium and calcium salts thereof as described in German Patent No. 2,001,017.7.

As indicated, products within the scope of the present invention may include no sweetener at all. If sweetener is included, the amount of sweetener is effective to provide the desired degree of sweetness, generally 0.001 to 70 wt. % of the final product. Colorants can be present in the chewing gums and confections of the present invention. Examples include the pigments such as titanium dioxide and other dyes suitable for food, drug and cosmetic applications known as F.D. & Co dyes, and the like. The materials may be incorporated in amounts of up to about 6% by weight, preferably under about 1% by weight.

Chewing gums in accordance with the present invention are formulated in accordance with essentially conventional processing technology. Thus, preferably, the gum base including any resins, plasticizers, fillers and/or other gum base components are softened together by heating and then mixed together with the flavoring component, and the mixture is stirred together for a time sufficient to insure a homogenous mass. The mass can be formed into pellets or into slabs from which individual stick-type pieces are cut using technology familiar to those skilled in this art.

EXAMPLE

Chewing gum is prepared from the components set forth in the following Table 1:

TABLE 1

(all amounts in wt. %)

| Component | Amount |
|---|---|
| Sorbitol powder | 42.6% |
| Gum base | 30.0 |
| Hydrogenated glucose syrup | 17.0 |
| Glycerin | 5.0 |
| Sorbitol solution, 70% | 4.0 |
| Peppermint oil | 1.0 |
| Peppermint oil encapsulated in gelatin | 0.1 |
| Aspartame | 0.3 |
| TOTAL | 100.00 |

What is claimed is:

1. A chewing gum comprising a flavoring component, said flavoring component comprising particles having a water-soluble hydrophilic shell encapsulating one or more hydrophobic liquid flavorants, wherein said one or more flavorants are releasable from said shell upon chewing of said gum, wherein said shell consists of gelatin; said one or more flavorants comprise 70 wt. % to 90 wt. % of said particles, and said particles are 0.1 mm to 1.0 mm in diameter.

2. A chewing gum according to claim 1 wherein in said particles said flavorants comprise about 70 wt. % thereof and said shell comprises about 30 wt. % thereof.

3. A chewing gum according to claim 1 wherein said particles comprise about 0.005 to about 3.0 wt. % of said gum.

4. A chewing gum according to claim 1 wherein said flavorant is selected from the group consisting of peppermint oil, menthol, cinnamon oil, spearmint oil, vanilla, wintergreen oil, lemon oil, orange oil, grape, lime oil, grapefruit oil, apple, apricot essence, and mixtures thereof.

5. A chewing gum according to claim 1, further comprising a sweetener.

6. A chewing gum according to claim 5 wherein said sweetener is selected from the group consisting of sucrose, glucose, corn syrup, dextrose, invert sugar, fructose, saccharine, salts of saccharine, cyclamic acid, salts of cyclamic acid, aspartame, dihydrochalcones, glycyrrhizin, Stevia rebaudiana, monellin, thalmatin, Sucralose, isomaltitol, neosugar, lactitol, polydextrose, maltitol, sorbitol, sorbitol syrup, mannitol, xylitol, hydrogenated starch hydrolysate, Acesulfame, salts of Acesulfame, and mixtures thereof.

* * * * *